United States Patent [19]

Amagami et al.

[11] 3,823,296

[45] July 9, 1974

[54] INDUCTION HEATING COIL ARRANGEMENT IN INDUCTION HEATING EQUIPMENT

[75] Inventors: Keizo Amagami; Hazime Mori; Takao Kobayashi; Mitsuyuki Kiuchi; Yoshio Ogino, all of Osaka, Japan

[73] Assignee: Matsushita Electric Industrial Company, Limited, Osaka, Japan

[22] Filed: July 26, 1972

[21] Appl. No.: 275,306

[30] Foreign Application Priority Data

| | | |
|---|---|---|
| Apr. 10, 1972 | Japan | 47-36368 |
| Apr. 10, 1972 | Japan | 47-36369 |
| Apr. 10, 1972 | Japan | 47-36592 |
| Apr. 12, 1972 | Japan | 47-37247 |
| Apr. 10, 1972 | Japan | 47-42647[U] |

[52] U.S. Cl. .......... 219/10.77, 219/10.49, 219/10.79

[51] Int. Cl. .......... H05b 5/04

[58] Field of Search .......... 219/10.49, 10.75, 10.77, 219/10.79; 321/11, 45 C; 336/100, 132, 136, 198; 175/35 R, 35 CE, 35 MS

[56] References Cited

UNITED STATES PATENTS

| | | | |
|---|---|---|---|
| 932,242 | 8/1909 | Berry | 219/10.49 |
| 2,388,848 | 11/1945 | Howe | 174/35 MS |
| 2,507,344 | 5/1950 | MacGeorge | 336/136 X |
| 2,603,675 | 7/1952 | Binok | 174/35 R |
| 3,175,173 | 3/1965 | Welch | 336/100 X |
| 3,238,434 | 3/1966 | Blitz et al. | 174/35 MS |
| 3,428,929 | 2/1969 | Brown et al. | 336/198 X |
| 2,429,819 | 10/1947 | Jordan | 219/10.77 |
| 3,534,146 | 10/1970 | Fell | 174/35 MS |
| 3,697,716 | 10/1972 | Koanaumpf | 219/10.49 |
| 3,710,062 | 1/1973 | Peters | 219/10.49 |

*Primary Examiner*—Bruce A. Reynolds

[57] ABSTRACT

Herein disclosed is an inverter device for use in an induction heating equipment in which an oscillating current having a suitable frequency is fed to an induction heating coil which is placed in proximity to a material to be heated, whereby eddy current and hysteresis loses are invited in the material to be heated so that heat is generated in the material. The inverter device features provision of noise preventive means, adapted to dampen out the high-frequency field built up by the component elements of the inverter circuit, leak current preventing means adapted to prevent leakage of current from the material to be heated to ground, and a variable inductor arrangement adapted to vary the apparent inductance of the induction heating coil. A typical application of the inverter device is an induction heating cooking equipment.

2 Claims, 18 Drawing Figures

INDUCTION HEATING COIL ARRANGEMENT IN INDUCTION HEATING EQUIPMENT

The present invention relates to an induction heating equipment and more particularly to an induction heating equipment using an inverter circuit of the self-exciting chopper type.

In the induction heating equipment, an electrically conductive or semiconductive material is subjected to a changing magnetic field which is established in the material by an electric current having a suitable frequency and flowing in proximity to the material to be heated. The changing magnetic field in the material produces an eddy current loss and a hysteresis loss therein so that the temperature of the material increases. The equipment operating on this basic principle is well known in the art and has found extensive applications in hardening or smelting metal works for industrial purposes. While the induction heating equipment of this character may be used for any industrial purposes and in kitchen utensils, the equipment will be herein described as being typically the kitchen ovens or ranges for cooking food by the induction heating process.

The chopper type inverter of the induction heating equipment usually uses a silicon controlled or otherwise gate-controlled rectifier of semiconductor and a diode. The silicon controlled rectifier and diode are connected in parallel and in opposite directions across a source of d.c. power such as a full-wave rectifier unit of the bridge construction powered by an a.c. power source. These silicon controlled rectifier and diode are further connected in parallel across a resonance circuit including a commutating capacitor and an induction element. An induction heating coil and a smoothing capacitor are serially connected across the commutating capacitor. In order that the magnetic field induced by the inverter circuit be varied as desired during operation, a variable induction element is usually connected serially or in parallel to the induction heating coil whereby the combined inductance achievable in the inverter unit can be varied by varying the inductance of the variable induction element. The inverter circuit usually further includes a smoothing filter capacitor or coil connected in series with the d.c. power source. The silicon controlled rectifier has a gate terminal which is connected to a gate pulse generator having a timing circuit producing a pulse train in accordance with the oscillation frequency of the resonance circuit of the inverter circuit.

When, in operation, the inverter circuit is switches in, the flow-reversing capacitor of the resonance circuit is charged from the d.c. power source serially connected thereto. The gate pulse generator then triggers the silicon controlled rectifier through its gate terminal in a timed fashion. This causes an oscillating current to flow from the commutating capacitor through the silicon controlled rectifier and the induction element serially connected to the capacitor. When the flow of the oscillating current through the capacitor is reversed, then the current flows from the capacitor through the induction element and the diode connected to the capacitor in parallel with and in an opposite direction to the silicon controlled rectifier. Thus, the oscillating current flows alternately through a loop including the capacitor, silicon controlled rectifier and induction element and through a loop including the induction element diode and capacitor in these sequences. If, thus, operating parameters of the inverter circuit are selected in a manner that the intervals in which the oscillating current flows through the diode are longer than the turn-off intervals of the silicon controlled rectifier, then the silicon controlled rectifier will be made non-conductive and accordingly the flow of the oscillating current interrupted during such intervals. If, thus, the pulse train is imparted to the gate terminal of the silicon controlled rectifier at controlled timings, then the voltage across the commutating capacitor will be oscillated at frequencies governed by such timings. As a consequence, the resonance circuit including the resonance capacitor and induction heating coil is caused to resonate with the voltage across the commutating capacitor. If, in this instance a material to be heated, such as a cooking pan or pot, is placed adjacent the induction heating coil, the equivalent circuit of the induction heating coil now has an effective inductance and an effective resistance whereupon heat is generated in the cooking pan, pot or the like.

By varying the inductance of the variable induction element serially connected to the induction heating coil during operation, the current to be fed to the induction heating coil and accordingly the induced current flowing through the material to be heated are varied.

The present invention contemplates provision of an improved induction heating equipment using the chopper type inverter circuit of the above described general character.

An important object of the present invention is to provide an induction heating equipment having an improved inverter device in which the high-frequency fields built up by various component elements of the circuits are practically completely dampened out for the purpose of eliminating field disturbances on electric equipment and appliances such as television receivers which are placed in the neighbourhood of the induction heating equipment as would otherwise be often experienced during operation of the heating equipment. This object will be accomplished basically in an arrangement in which the induction heating unit is positioned underneath and at a spacing from an insulating plate forming part of the inverter device which also includes noise preventive means and output control means.

It is another important object of the present invention to provide an induction heating equipment having an improved inverter device in which the flow of a leak current from the material to be heated to ground as would otherwise be caused by the electrostatic phenomana is minimized or practically completely eliminated so as to provide safety of operation of the induction heating equipment, to accordingly provide the operator of the equipment with feeling of assuredness during operation, and to prevent the induction heating coil of the inverter circuit from being overheated. For this purpose, the noise preventive means forming part of the inverter device may comprise a shielding chasis formed of non-magnetic metal and accommodating therein all the electric component elements of the inverter device excepting the induction heating coil, a through-type capacitor having excellent high-frequency characteristics and grounding to the shielding chasis all the lead wires outgoing from the chasis, a metal shield casing positioned externally of and electrically insulated from the shielding chasis, and a support frame of a non-magnetic material supporting the induction heating coil, wherein the metal shielding chasis and support frame for the induction heating coil are grounded.

The above mentioned object of preventing leakage of the current from the material to be heated to ground may also be accomplished through provision of a gap between the insulating plate and the underlying induction heating coil or through provision of the insulating plate which has an electrically conductive coating connected to ground. Or otherwise the induction heating coil of the inverter device may be constructed as a multilayer type wherein a terminal adjacent the insulating plate is connected to the positive bus line of the inverter circuit.

Still another important object of the present invention is to provide an induction heating equipment having an improved inverter device which incorporates a variable inductor is serially connected to the induction heating coil for alleviating performance inaccuracies of the individual component elements of the inverter circuit as resulting from production errors, providing adequately prolonged turn-off intervals of the silicon controlled or otherwise gate-controlled rectifier of the inverter circuit so as to prevent failure of the commutation of the oscillating current through the rectifier, and assuring easy and stabilized control over the output from the induction heating coil of the inverter circuit during operation. The variable inductor which is thus connected to the induction heating coil forms part of the output control means of the inverter device of the induction heating equipment according to the present invention.

The variable inductor of the chopper type inverter device is usually made up of an induction coil and a core of ferrite of other materials having a relatively high magnetic permeability. The core is positioned in proximity to the induction coil and is moved relative to the coil so as to have the inductance of the inductor varied during operation. Where the inductance of the variable inductor is varied in this manner, the inductance varies generally in a quadratic fashion as the amount of displacement varies. If, for instance, the core is moved by the use of a control lever directly connected thereto, it is impossible to have the inductance of the variable inductor varied in proportion to the distance of movement of the control lever and accordingly the core relative to the coil. This further creates difficulty in accurately calibrating the inductor on the part of the manufacturers.

It is, therefore, further and another important object of the present invention to provide an induction heating equipment having an improved inverter device which incorporates a variable inductor adapted to achieve an inductance which can be varied substantially in proportion to the distance of movement of the control lever relative to the coil. It is still another object of the invention to provide an induction heating equipment having an improved inverter device incorporating a variable inductor which can be accurately calibrated during production. To accomplish these objects may comprise a plurality of coils which are serially connected together and spaced apart from each other at variable distances and a core which is movable relative to these coils. Or otherwise, the inductor may comprise a coil and a plurality of cores which are positioned in proximity to and movable relative to the coil.

Yet, it is another object of the present invention to provide an induction heating equipment having an improved inverter device that incorporates a plurality of induction heating coils so as to permit the heating of two or more materials all at a time or independently through simplified manipulative procedures.

Other objects, features and advantages of the induction heating equipment according to the present invention will become more apparent from the following description taken in conjunction with the accompanying drawings, in which like reference numerals designate corresponding parts and elements throughout the figures and in which.

Figure 1:
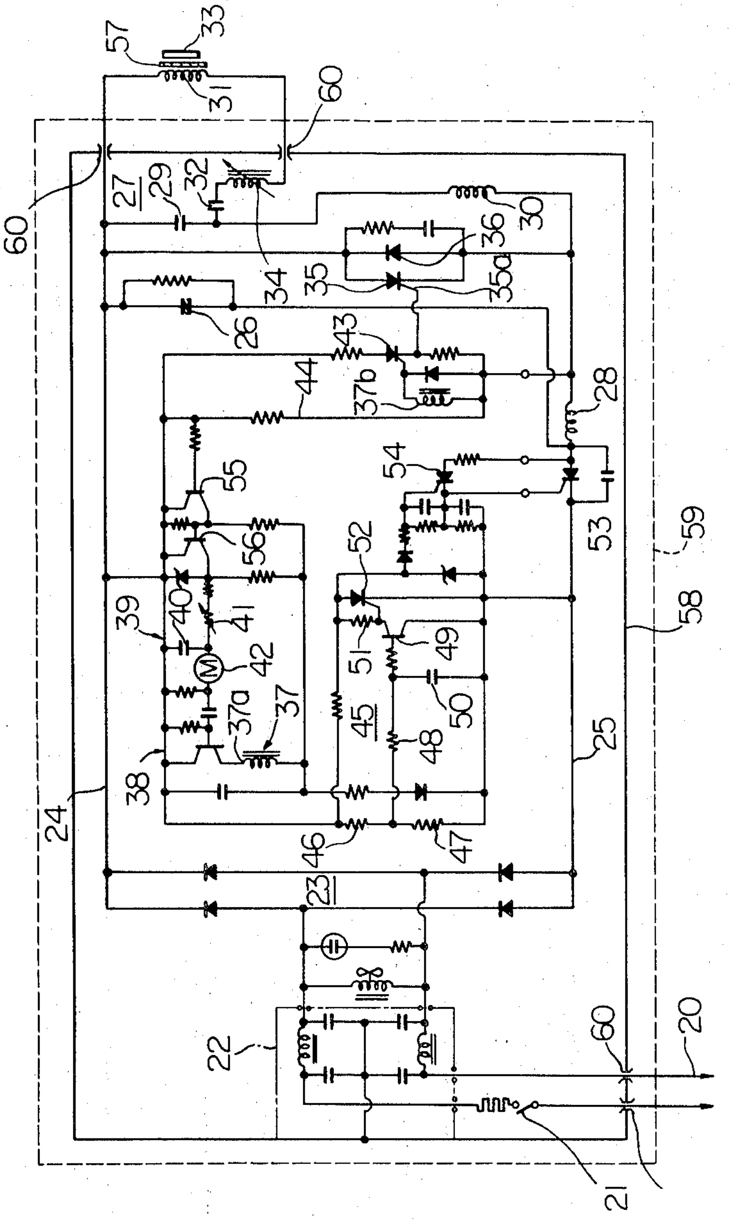
FIG. 1 is a schematic circuit diagram showing an overall circuit arrangement of the chopper type inverter device of the induction heating equipment according to the present invention.

Reference is now made to the drawings, first to FIG. 1 which illustrates an overall circuit arrangement of the inverter device of the induction heating equipment according to the present invention. The inverter device has an input terminal 20 which is connected to an a.c. power source, not shown. The input terminal 20 is connected through an actuating switch 21 and a line filter 22 to a full-wave rectifier unit 23 of the bridge construction. The line filter 22 is herein shown as being of the $\pi$-type construction by way of example. The outputs of the full-wave rectifier unit 23 are connected to positive and negative bus lines 24 and 25, respectively. A filter capacitor 26 is connected between these bus lines 24 and 25. The full-wave rectifier unit 23 and this filter capacitor 26 provide a power source for a chopper type inverter unit which is generally designated by reference numeral 27.

The inverter unit 27 includes a filter inductor 28 which is connected between the bus lines 24 and 25. A commutating capacitor 29 and a commutating inductor 30 are serially connected to the filter inductor 28, via., between the positive and negative bus lines 24 and 25, respectively. An induction heating coil 31 and a smoothing capacitor 32 are serially connected across the commutating capacitor 29. Designated by reference numeral 33 is a material to be heated by the inverter device herein shown. Between the induction heating coil 31 and smoothing capacitor 32 is serially connected a variable inductor 34 which will be described later in more detail. A silicon controlled or otherwise gate-controlled rectifier 35 and a diode 36 are connected in parallel to the bus lines 24 and 25 in opposite directions. More specifically, the silicon controlled rectifier 35 has an anode terminal connected to the positive bus line 24 and a cathode terminal connected to the negative bus lines while the diode 36 has cathode and anode terminals connected to the positive and negative bus lines 24 and 25, respectively, as shown. The silicon controlled rectifier 35, moreover, has a gate terminal 35*a* connected to the secondary winding of a gate pulse transformer 37. This gate pulse transformer 37 has a primary winding 37*a* connected to a gate pulse amplifier 38 and a secondary winding 37*b* connected to the gate terminal 35*a* of the silicon controlled rectifier 35 and operatively connected with the primary winding 37*a* though shown as separated therefrom. The gate pulse amplifier 38 is controlled by a gate pulse generating circuit 39 which comprises a capacitor 40, a resistor 41 and a trigger element 42 and which supplies gate pulses to the gate terminal 35*a* of the silicon controlled rectifier 35 through a silicon controlled rectifier 43.

The pulse generating circuit 39 is connected to the filter inductor 28 through a line 44. This pulse generating circuit 39 is actuated by a voltage which equals the voltage across the silicon controlled rectifier 35 and diode 36, viz., between the bus lines 24 and 25. This voltage is produced when a zero-volt switching circuit 45 is completed. This zero-volt switching circuit 45 is provided for the purpose of delaying the timing of the generation of the pulse from the pulse generating circuit 39 until the voltage impressed upon the circuit 39 reaches a predetermined level, actuating in a stabilized condition the chopper type inverter unit 27 at an instant when inverter unit 27 is energized from the full-wave rectifier 23 in a given interval after the actuating switch 21 has been closed and preventing the flow of a rush current to the filter capacitor 26.

The zero-volt switching circuit 45 comprises resistors 46 and 47 connected between the bus lines 24 and 25 for dividing the voltage thereon into fractions with a desired ratio. A node between these resistors 46 and 47 is connected through a resistor 48 to the base electrode of a transistor 49. A capacitor 50 is connected across the base and emitter electrodes of the transistor 49 for making up a delaying circuit together with the resistor 48. The transistor 49 has a collector electrode which is connected to the positive bus line 24 through a resistor 51. A silicon controlled rectifier 52 has a gate terminal connected to a node between the collector electrode of the transistor 49 and the resistor 51. The anode and cathode terminals of this silicon controlled rectifier 52 are connected to the positive and negative bus lines 24 and 25, respectively, in parallel to the transistor 49, as shown. The silicon controlled rectifier 52 is triggered when the transistor 49 is rendered conductive. A silicon controlled rectifier 53 is connected between the filter inductor 28 and the negative output terminal of the full-wave rectifier unit 23, having an anode terminal connected to the cathode and anode terminals of the silicon controlled rectifier 35 and diode 36, respectively, of the inverter unit 27. The silicon controlled rectifier 53 serves as a zero-volt switching element which is rendered conductive when the voltage supplied from the full-wave rectifier unit 23 is at a zero level. The anode and gate terminals of this silicon controlled rectifier 53 are shunted by a silicon controlled rectifier 54 which is made conductive for controlling the silicon controlled rectifier 53 when the silicon controlled rectifier 52 is nonconductive.

When the actuating switch 21 is closed, the capacitor 50 of the zero-volt switching circuit 45 is charged through the resistor 48 with the fraction of the voltage which is divided by the resistors 46 and 47. When the voltage across the capacitor 50 reaches a predetermined level, then the transistor 49 is triggered which is consequently rendered conductive. When, on the other hand, the switch 21 is closed, the silicon controlled rectifier 52 is made conductive through the resistor 51. In this condition, the silicon controlled rectifier 54 remains non-conductive because the gating voltage thereof is dependent upon the voltage across the silicon controlled rectifier 52. The silicon controlled rectifier 53 on the bus line 25 is consequently kept non-conductive.

As the potential on the base electrode of the transistor 49 is stepped up as previously mentioned and consequently the transistor 49 is rendered conductive, then the gate terminal of the silicon controlled rectifier 52 is short-circuited with the result that a voltage is built up across the silicon controlled rectifier 52. This rectifier 52 remains conductive once it has been actuated. In other words, the silicon controlled rectifier 52 remains non-conductive as long as the voltage impressed thereupon is lower than a predetermined level, viz., in the neighbourhood of a zero level. Thus, in order for the silicon controlled rectifier 52 to restore its current blocking ability, it is necessary that the voltage supplied thereto diminishes to the vicinity of zero level. In this condition, the transistor 49 is kept conductive with the gate terminal of the silicon controlled rectifier 52 short circuited and, thus, the silicon controlled rectifier 52 is rendered non-conductive in the subsequent cycles so that a voltage is built up thereacross whereby the silicon controlled rectifier 54 is triggered through its gate terminal.

The silicon controlled rectifier 53 on the negative bus line 25 is at all times rendered conductive when the voltage from the rectifier unit 23 is at a zero level, as will be understood from the foregoing description. When the silicon controlled rectifier 53 is made conductive in this manner, the capacitor 26 is charged and concurrently a base current is fed to the transistor 55 which forms part of the gate pulse generating circuit 39. This causes the transistor 56 to have its base electrode short-circuited with the result that capacitor 40 is charged through the resistor 41. When the voltage across the capacitor 40 reaches a predetermined level, then the triggering element 42 acts to produce a gate pulse through the pulse amplifier 38. The gate pulse thus produced is applied through the secondary winding 37*b* of the pulse transformer 37 to the gate terminal of the silicon controlled rectifier 43. The silicon controlled rectifier 43 is accordingly rendered conductive and, in turn, makes the silicon controlled rectifier 35 of the inverter unit 27 conductive.

An oscillating current is then built up by the commutating capacitor 29 and commutating inductor 30. This oscillating current with a frequency determined by the characteristics of the capacitor 29 and commutating inductor 30 is fed to the induction heating coil 31. In accordance with the present invention, this heating coil 31 is placed underneath an insulating plate 57 on which the material 33 to be heated is positioned. The material 33 is thus induction heated through this insulating plate 57 with the coil 31 excited by the oscillating current.

All the parts and elements making up the above described circuit arrangement except for the induction heating coil 31 are encased within noise preventive shield casings 58 and 59 as indicated by full and broken lines, respectively, while, all the lines leading from these shield casing are providing with through-type capacitors which are commonly designated by reference numeral 60. Provision of the insulating plate 37, shield casings 58 and 59 and through-type capacitors 60 is intended to prevent field disturbances which would otherwise incurred on electric equipment placed in the neighbourhood of the induction heating equipment and to prevent or at least minimize the leakage of the current from the material to be heated, as previously noted.

Figure 2:
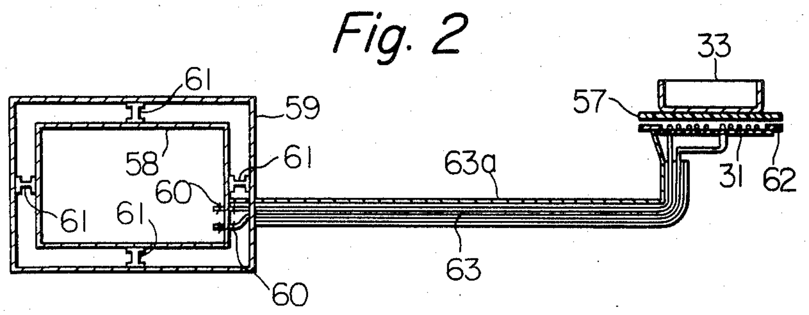
FIG. 2 is a sectional view showing a construction, in a preferred form, of the noise preventive means, to be incorporated in the inverter device shown in FIG. 1.

Preferred constructions of the noise preventive shield casings 58 and 59 and the through-type capacitors 60 thus forming essential part of the inverter device having the circuit arrangement above described are now illustrated in FIG. 2.

Referring to FIG. 2, the inner and outer shield casings 58 and 59, respectively, are spaced apart from each other through insulating elements 61 interposed therebetween. The inner shield casing 58 has accommodated therein the component parts and elements, not shown, except for the induction heating coil 31, as above mentioned. This heating coil 31 underlies an insulating plate 57 at a spacing therefrom and the material 33 to be heated such as a cooking pan or pot is placed upon this insulating plate and heated from the coil 31 therethrough. Designated by reference numeral 62 is a supporting frame for the induction heating coil 31, which frame is usually formed of a non-magnetic material and supports the coil. All the wires 63 leading from the induction heating coil 31 are wrapped in shield wires 63*a* and connected to the component parts and elements in the shield casings 58 and 59, through-type capacitors 60 having excellent high-frequency characteristics. These lead wires 63 extending through the metal casing or shielding chasis 58 are grounded through the through-type capacitors 60 and shielding chasis 58 while the support frame 62 is also connected to ground.

It is well known in the art that through dual shielding of the high-frequency circuit such as the inverter circuit as above mentioned the leakage field is dampened out approximately twice in decibels as large as the amount of field leakage dampened through single shielding.

It is true that the arrangement in which the lead wires are connected through the through-type capacitors to the metal shielding chasis and in which the high-frequency components are by-passed through the shielding chasis is in itself known. The intent of the present invention is to dampen out the high-frequency field which can not be dampened where such prior art arrangement is utilized. This is achieved by grounding the inner shield casing or chasis 58 and induction heating coil support frame 62 as previously described.

Provision of the insulating elements 61 between the inner and outer metal shield casings 58 and 59, respectively, will prove advantageous in protecting the operator from being subjected to electric shocks when he touches the outer shield casing 59 in case the inner shield casing 58 is improperly grounded or fails to be grounded for unforeseen reasons.

Figure 3:
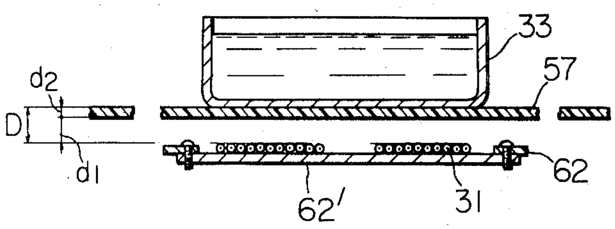
FIG. 3 is a sectional view showing a construction, in a preferred form, of the leak current preventive means to be incorporated in the inverter device shown in FIG. 1.

FIG. 3 illustrates a more detailed arrangement of the induction heating coil 31 and insulating plate 57. The coil 31 is supported by a support frame 62 and an insulating means such as a glass plate 62' fastened to the support frame 62 to carry the coil 31 thereon. The coil is positioned below and at a suitable spacing from the insulating plate 57 as shown. For the clear understanding of the advantages of the shown arrangement, an analysis will be made into the leakage of the current from the coil 31 to ground.

Assuming the static capacity of the space between the coil 31 and insulating plate 57 to be $C_1$ and the static capacity of the insulating plate 57 to be $C_2$, then there result the following relations;

$$C_1 = \epsilon_1 \cdot (F/d_1), \text{ and} \quad (1)$$

$$C_2 = \epsilon_2 \cdot (F/d_2), \quad (2)$$

where $d_1$ is a distance between the coil 31 and insulating plate 57, $d_2$ is a thickness of the insulating plate 57, $\epsilon_1$ and $\epsilon_2$ are dielectric constants of air and the insulating plate, respectively, and F is an effective area of the coil 31. The combined static capacity $C$ is therefore written:

$$C = C_2 \cdot C_2/(C_1 + C_2) = F^2 \cdot \epsilon_1 \cdot \epsilon_2(1/d_1 \cdot d_2)/F(\epsilon_1/d_2 + \epsilon_2/d_2) = F \cdot \epsilon_1 \cdot \epsilon_2(1/d_1 \cdot d_2)/(\epsilon_1/d_1 + \epsilon_2/d_2) = F \cdot \epsilon_1 \cdot \epsilon_2/(\epsilon_1 \cdot d_2 + \epsilon_2 \cdot d_1). \quad (3)$$

As is well known, the leak current $i$ is given by an equation $$i = E/z = E/(\tfrac{1}{2}\pi f C) = 2\pi f E \cdot C, \quad (4)$$

where $E$ is a leak voltage and $z$ is an impedance of the insulating plate 57 and the material 33 to be heated which is placed upon the insulating plate.

In consideration of the relation of Eq. 3, this Eq. 4 is written $$i = 2\pi f E \cdot C = 2\pi f E \cdot F \cdot \epsilon_1 \cdot \epsilon_2/(\epsilon_1 \cdot d_2 + \epsilon_2 \cdot d_1). \quad (5)$$

To make clearer the relationship between the leak current $i$ and the distance $d_1$ between the coil 31 and insulating plate 57, the value $2\pi f E$ may be assumed to be a constant. If this constant is written as $K$, then the Eq. 5 can be rewritten in the form of $$i = K \cdot (F \cdot \epsilon_1 \cdot \epsilon_2)/\epsilon_1 \cdot d_2 + \epsilon_2 \cdot d_1). \quad (6)$$

Eq. 6 can be further rewritten as $$i = K \cdot F \cdot 1/(d_2/\epsilon_2 + d_1/\epsilon_2). \quad (7)$$

Figure 4:
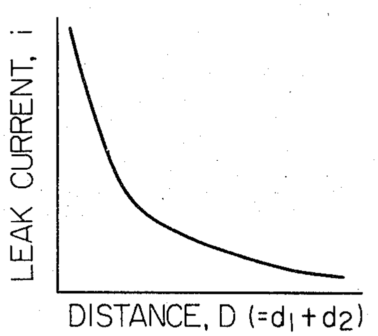
FIG. 4 is a graph showing a typical relationship between the distance between the induction heating coil and the material to be heated and the leak current from the material to ground.

From Eqs. 6 and 7, it is apparent that the leak current $i$ is proportional to the value of $f \epsilon_1 \cdot \epsilon_2$ and to the values of $1/d_1$ and $1/d_2$. This will be roughly ascertained from the curve of FIG. 4 in which the variation of the leak current $i$ is indicated in terms of the distance $D$ which equals $d_1 + d_2$.

If, in this instance, the insulating plate 57 is formed of glass ceramics (which is known under the trade name of Pyroceram) then the dielectric constant $\epsilon_2$ of the insulating plate ranges from 5 to 10, whilst the dielectric constant $\epsilon_1$ of air is 1. Thus, assuming that the leak current $i$ is constant, the thickness $d_2$ of the insulating plate 57 may be reduced significantly to the advantage of production economy if the insulating plate is positioned at an increased spacing from the underlying induction heating coil 31, as will be clearly understood from Eq. 7. This will mean that the amount of leak current can be reduced nearly to zero where the insulating plate and coil are positioned at an increased spacing from each other.

Figure 5:
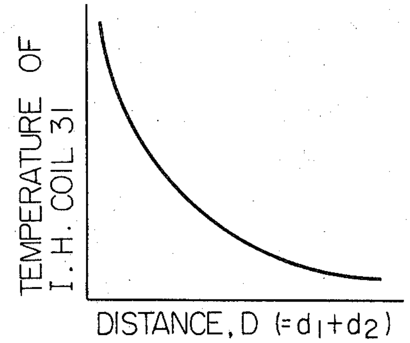
FIG. 5 is a graph showing a representative relationship between the distance between the induction heating coil and the material to be heated and the temperature of the material being heated.

On the other hand, the temperature $T$ of the induction heating coil 31 varies at the distance $D$ between the coil and the material 33 to be heated varies, as indicated by the curve of FIG. 5, from which it is apparent that the temperature $T$ decreases as the distance $D$ increases. Thus, provision of the space between the induction heating coil 31 and insulating plate 33 is also advantageous for the prevention of the overheating of the coil 31. The experiments we conducted have revealed that the temperature of the induction heating coil can be maintained below about 18°C where a cooking pan of stainless steel is heated with an output power of 1.2 kilowatt and the cooking pan spaced 8 millimeters from the coil.

Provision of an increased gap between the induction heating coil 31 and insulating plate 57 is thus useful for the purpose of minimizing the leak current from the material to be heated to ground and preventing the induction heating coil from becoming overheated. Such an increased gap between the coil and insulating plate will, however, be objectionable from the view point of providing the ease of operation and commercial value of the induction heating equipment as a whole. In other words, provision of the increased gap would result in impairment of the prominent feature of the induction heating equipment using an inverter device in which the induction heating coil is located separately of the remaining shielded component parts and elements for permitting placement of the material to be heated on a flat and relatively thin plate. This can be avoided in the arrangement according to the present invention in which the induction heating coil and the material to be heated are spaced apart from each other by an appreciable distance of the order of about 8 millimeters as above mentioned.

It will now be appreciated from the foregoing description that the arrangement of the induction heating coil and induction heating coil as illustrated in FIG. 3 is advantageous for minimizing the leak current from the material to be heated and for enabling the coil to be maintained at a temperature lower than a certain level without resort to forced cooling. Such arrangement is thus adapted to provide safety and assuredness of operation because of its improved insulating performance and to provide an increased durability because the induction heating coil is prevented from being overheated during operation. It may be added that the thermal capacity of the insulating plate can be made significantly smaller than that of the insulating plate which is in direct contact with the induction heating coil whereby an improved heat radiation can be achieved.

Figure 6:
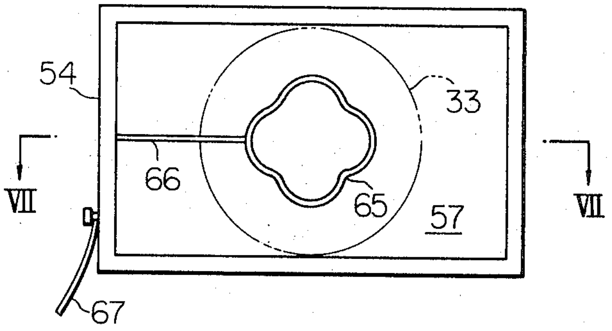
FIG. 6 is a top plan view showing a construction in another preferred form of the leak current preventive means.
Figure 7:
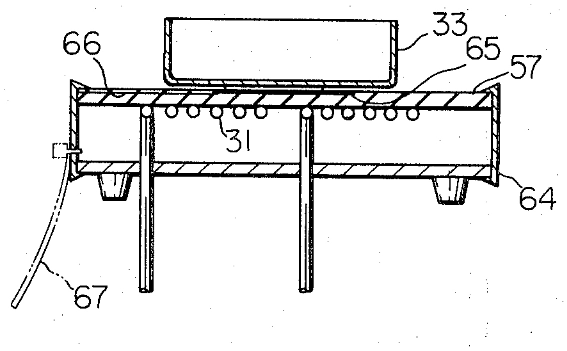
FIG. 7 is a section on line VII—VII of FIG. 6.

Another preferred form of leak current preventive arrangement for the inverter device of the induction heating equipment is now illustrated in FIGS. 6 and 7. In the arrangement herein shown, the insulating plate 57 overlying the induction heating coil 31 is supported on a support frame 64 of an electrically nonconductive material. An electrically conductive film of a suitable pattern is formed on an upper face of the insulating plate 57, as indicated by reference numeral 65. This conductive film 65 is herein shown as having a pattern of a four-leaved clover by way of example. The conductive film 65 may be applied to the insulating plate 57 through vacuum evaporation or chemical plating of copper, nickel or tin oxide. A conductive film 66 in a line form is also applied to the upper face of the insulating plate, connected at one end to the conductive film 65 of the generally annular configuration and terminates at the support frame 64. This conductive film line 66 may be applied to the insulating plate 57 concurrently with formation of the conductive film 65 and serves as a lead wire for grounding the film 65. Thus, a grounding line 67 is connected to the leading end of the conductive film line 66, having its leading end connected to ground directly or through a suitable conductor.

In this instance, there may be a fear of the conductive films 65 and 66 being heated by the alternating magnetic field induced by the induction heating coil 31. Experiments, however, show that the evolution of heat in these conductive films 65 and 66 does not takes place insofar as the films have limited widths of the order of 3 to 4 millimeters where they are formed of copper. It has also turned out from further experiments that the conductive films 65 and 66 can be prevented from being pealed off the insulating plate 57 and thus last practically permanently if the films are formed of tin oxide. The conductive film 65 may be configured in any desired pattern as previously noted but, in view of the results of the above-mentioned experiments conducted by us, it is preferable that the film have the width of the order of approximately 3 to 4 millimeters and a generally annular pattern so as to be capable of contacting the bottom wall of the material to be heated over as large an area as possible.

It will now be appreciated from the foregoing description that the arrangement shown in FIGS. 6 and 7 is adapted to have the material to be heated grounded with certainty and placed assuredly on the flat insulating plate serving as a carrier for the material.

The insulating plate interposed between the induction heating coil and material to be heated will make up an equivalent of a capacitor therebetween while serving to prevent the flow of the leak current from the material to ground. If, in this instance, the insulating plate has a thickness $d$ and a dielectric constant $\epsilon$ and has an area S coextensive with the material to be heated, then the static capacity $c$ achieved between the insulating plate and the material to be heated is expressed as:

$$C = \epsilon \cdot (s/d). \quad (8)$$

Figure 8:
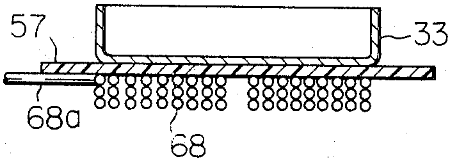
FIG. 8 is a sectional view showing a construction in still another preferred form of the leak current preventive means.

Thus, the static capacity between the insulating plate and the material to be heated may be increased to a considerable extent if the sizes of the insulating plate and material to be heated and/or the distance between these increase. Such an increased static capacity between the insulating plate and the material to be heated may be the cause of the flow of the current from the material to ground possibly through a human body when the human body is in touch with the material to be heated. The leak current produced in this manner sometimes amounts to the order of milliamperes and, as a result, the operator may be subjected to serious electric shocks during operation. FIG. 8 illustrates still another preferred arrangement adapted to prevent the flow of the leak current from the material to be heated as caused for the above noted reasons.

Referring to FIG. 8, the insulating plate 57 to carry thereon the material 33 to be heated overlies a triple-layer coil 68 of the disc type. The outermost layer of this triple-layer coil 68 has an end 68$a$ connected to the positive bus line 24 from the full-wave rectifier unit 23 shown in FIG. 1. The multi-layer 68 used in the shown arrangement is intended to achieve a relatively high output power from a relatively small heating area.

Figure 9:
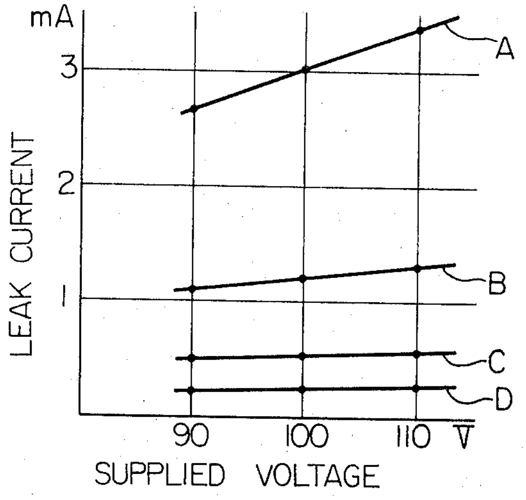
FIG. 9 is a graph showing various relationships between the voltage supplied from a power source and the leak current from the material to be heated to ground in different induction heating coil arrangements using the leak current preventive means shown in FIG. 8.

FIG. 9 illustrates plots indicating the leak currents produced where various induction heat coil arrangements are used. The plot A indicates the leak current which was produced where a double-layer coil of a 200 mm diameter was used in combination with an insulating plate having a 5 mm thickness. The inner layer of the double-layer coil was connected to the positive bus line of the inverter circuit while the outer layer thereof was connected to the negative bus line. As seen from this plot A, a leak current of approximately 3 milliamperes flew from the material to be heated when the voltage supplied to the inverter circuit was 100 volts. When the same coil as used in this experiment was then connected to the positive and negative bus lines of the inverter circuit through its outer and inner layers, respectively, viz., conversely to the direction of connection in the first experiment. The result of this experiment is indicated by a plot B in FIG. 9, from which it is seen that the leak current from the material to be heated is reduced to about 1 milli-ampere when the supplied voltage is 100 volts. This leak current accounts for nearly one-third of the leak current observed in the first experiment. A plot C indicates the result of another experiment in which the double-layered coil arranged similarly to the coil used in the second experiment was spaced apart from the overlying insulating plate so as to provide a gap of about 3 mm. The leak current produced with use of such arrangement is diminished below 1 milli-ampere. Where, moreover, a triple-layered coil having a diameter of 150 mm was used in combination with an insulating layer spaced about 3 mm apart from the coil and the outermost and innermost layers of the coil were connected to the positive and negative bus lines, respectively, of the inverter circuit, then a plot D was obtained from which it is evidently seen that the leak current is reduced to a practically negligible level.

From these experiments conducted by us, it has been made clear that the static capacity resulting from the provision of the insulating plate between the induction heating coil and the material to be heated can be sufficiently reduced and accordingly the leak current from the material to ground minimized through use of the coil having a reduced diameter. Since, moreover, an increased amount of output power is achieved by the use of the multi-layer coil, the coil can be positioned at an increased spacing from the material to be heated, thus contributing to further reducing the static capacity between the coil and the material to be heated. This static capacity can be still further reduced where the outermost layer of the multi-layer coil is connected to the positive bus line of the inverter circuit, as ascertained in the experiments conducted by us. It is thus apparent that the arrangement shown in FIG. 8 is useful in reducing to a minimum the current flowing from the material to be heated to ground possibly through a human body in touch with the material during induction heating of the material which may be the cooking pan or pot as previously noted.

Figure 10:
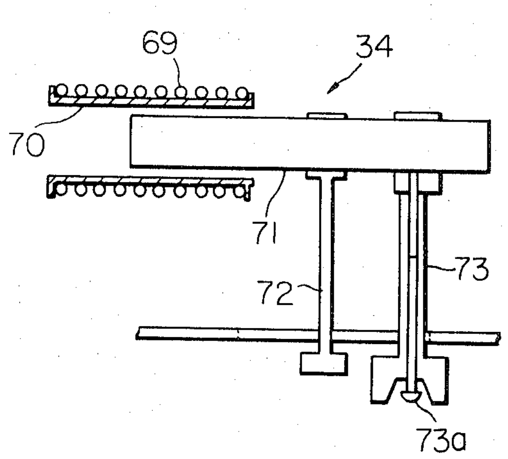
FIG. 10 is a sectional view showing construction in a preferred form of the output control means forming part of the inverter device of the induction heating equipment according to the present invention.
Figure 11A:
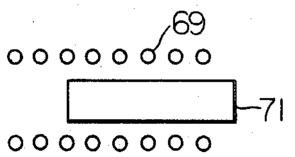
FIG. 11 shows various modifications of the configurations of the coil and core of the output control means shown in FIG. 10.
Figure 11B:
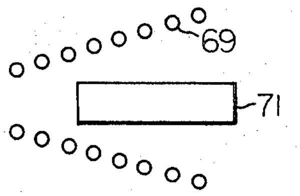
Figure 11C:
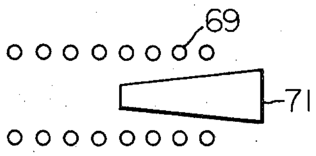
Figure 11D:
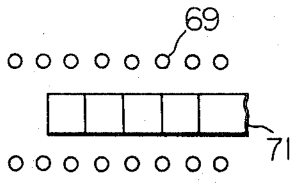
Figure 11E:
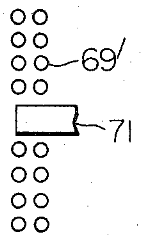

FIG. 10 now illustrates a preferred form of variable inductor arrangement which is adapted to vary the output power of the inverter device. As described with reference to FIG. 1, this variable inductor is serially connected to the induction heating coil across the commutating capacitor of the resonance circuit of the inverter device whereby the inductance of the inverter unit is varied as desired.

Referring to FIG. 10, the variable inductor arrangement which is generally designated by reference numeral 34 includes an induction coil 69 supported on an outer peripheral surface of a bored support member 70 which is held stationary. A core 71 of a material having a relatively high magnetic permeability such as ferrite for example is axially slidably received in the bored support member 70. This core 71 carries at its portion projecting from the support member 70 a calibration lever 72 and an output adjusting lever 73 associated with the calibration lever 72, as shown. The output adjusting lever 73 has a clamping screw 73$a$ extending therethrough and is slidable lengthwise of the ferrite core 71 when the claming screw 73$a$ is in a condition relaxed from the core as seen in FIG. 10.

During production, the inductance of the variable inductor 34 in the initial condition is adjusted through adjustment of the position of the output adjusting lever 73 relative to the core 71 by the use of the calibration lever 72. When optimum initial inductance is achieved in this manner, when the clamping screw 73$a$ of the output adjusting lever 73 in the particular position should be tightened against the core 70 whereby the adjusting lever 73 in situ is clamped to the core securely. The initial inductance of the variable inductor 34 can be in this manner calibrated to a proper value notwithstanding the production errors, if any, of the individual component pants and elements of the inverter circuit as a whole, let alone the ease of adjusting the inductance of the inverter unit in its entirety.

The induction coil 69 (and accordingly the bored support member 70) and the core 71 may be configured in any desired manner depending on the required induction characteristics of the inverter circuit including the variable inductor 34. Various examples of the configurations of the induction coil 69 and core 70 are illustrated in (*a*) to (*e*) of FIG. 11. The arrangement shown in (*a* ) has both the induction coil 69 and core 71 configured in cylindrical forms which are aligned with each other. In the arrangement shown in (*b*), the coil 69 is generally in the form of a truncated cone having an enlarged end through which the core 71 of a cylindrical configuration extends outwardly. Where the arrangement shown in (*b*) of FIG. 11 is used, the inductance will vary only at a limited rate incipiently when the core 71 is moved deeper toward the reduced end of the frusto-conical coil 69 and vary at an increasing rate as the core is further moved through the coil 69. In the arrangement shown in (*c*) of FIG. 11, the core 71 now assumes a frusto-conical form with its enlarged end protruded out of the coil 69 which is cylindrical, conversely to the arrangement of (*b*). In contrast to the arrangements in (*a*) to (*c*) of FIG. 11 in which the core 71 is formed of a single material such as ferrite or aluminium, the core 71 in the arrangement shown in (*d*) is made up of sections which are formed of two or more different materials such as ferrite and aluminium and which are bonded one to another in the longitudinal direction of the core. Although the coil 69 and core 71 are herein shown as cylindrical, they may be configured similarly to any of those illustrated in (*a*) to (*c*), where desired. The arrangement of (*e*) is an example in which a multilayer coil 69′ of the disc type is used as an alternative to the helical coil 69 used in the arrangements of (*a*) to (*e*).

The variable inductor 34 is usually connected srially to the induction heating coil of the inverter unit as previously noted but, where desired, the induction heating coil and variable inductor may be connected in parallel to the commutating capacitor of the resonance circuit.

The variable inductor arrangement shown in FIGS. 10 and 11 is thus intended to make adjustable the output power of the inverter unit through adjustment of the apparent inductance of the induction heating coil connected in series or parallel with the variable inductor. This arrangement is useful for eliminating the errors of the characteristics of the component parts and elements of the inverter circuit, permitting steplessly varying the inductance of the inverter unit during operation, assuring adequate turn-off intervals of the gate-controlled rectifier of the inverter unit so as to preclude failure of the commutation of the flow of the oscillating current in the inverter unit and to provide stabilized oscillation frequency, and eliminating the need for using a number of capacitors which would require considerable space for accommodation in the induction heating equipment.

Figures 12, 13, 14:
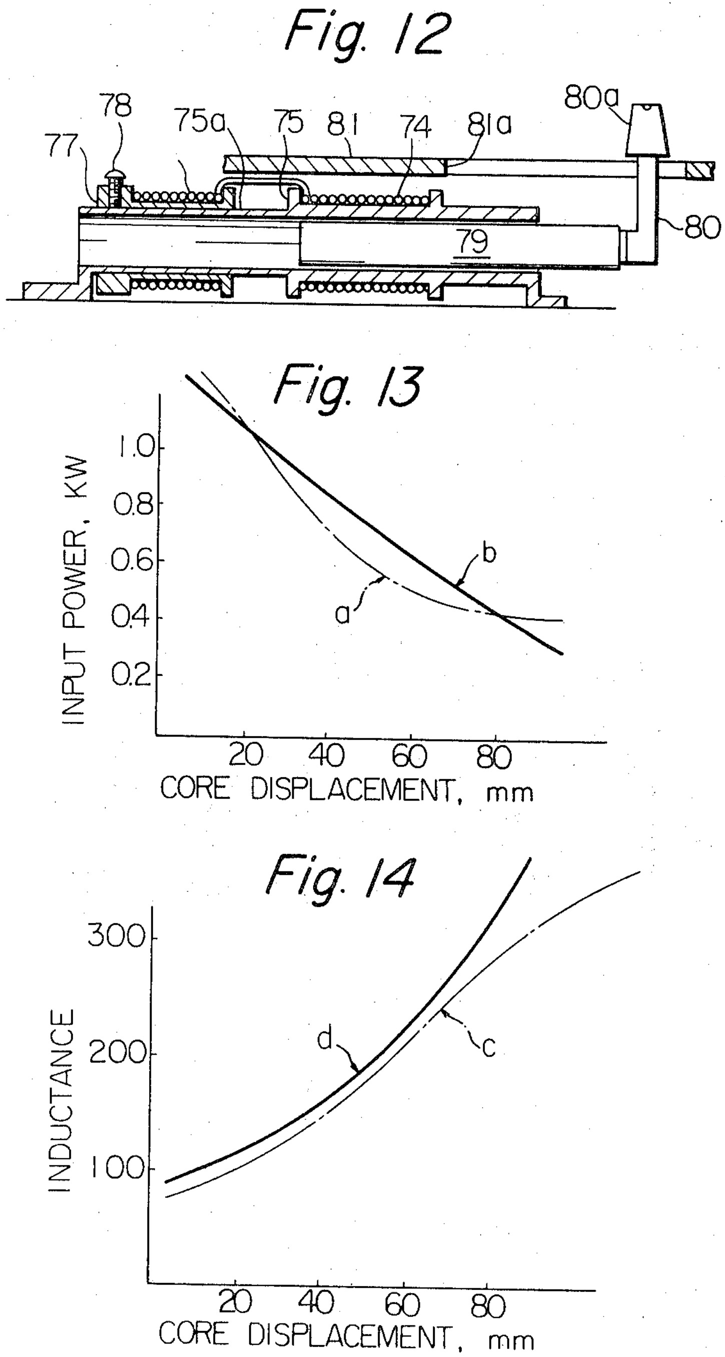
FIG. 12 is also a sectional view showing a construction in another preferred form of the output control means of the inverter device.
FIG. 13 is a graph showing examples of variation in the input power to the inverter devices of the prior art type and of the character herein disclosed as achieved when the cores of the control means for the variable inductors are moved relative to the coils of such means.
FIG. 14 is a graph showing examples of variation in the inductances of the variable inductors of the known type and of the character herein disclosed as achieved when the cores of the control means for the variable inductors are moved relative to the coils of such means.

As explained at the outset of the specification, the inductance of a usual variable inductor varies in a quadratic fashion as the core of the inductor is axially moved relative to the coil surrounding the core. Such a quadratic variation of the inductance is objectionable because the output power from the inverter circuit can not be achieved in proportion to the amount of displacement of the core and because intricate calibration is indispensable for initially adjusting the inductance on the part of the manufacturers. FIG. 12 illustrates a variable inductor arrangement which is free from these difficulties.

Referring to FIG. 12, the inductor arrangement includes a stationary coil 74 wound on an outer peripheral surface of a bored support member or bobbin 75 having an extension 75*a* and a movable coil 76 wound on an outer peripheral surface of a bored support member or bobbin 77 which is axially slidable on the extension 75*a* of the bobbin 75. The slidable bobbin 77 is provided with a clamping screw 78 for tightening the bobbin 77 against the outer peripheral surface of the extension 75*a* of the bobbin 75. A core 79 of ferrite or aluminium is axially movable through the bore in the bobbin 75 carrying the stationary coil 74, such movement of the core 79 being effected by the use of an adjusting lever 80 which is fast on the core 79 as shown. This adjusting lever 80 extends through a stationary panel 81 having an elongated slot 81*a* along which the lever 80 is manually moved at its knob 80*a*. The stationary and slidable bobbins 75 and 77, respectively, are usually made of an electrically nonconductive material.

The operation of the variable inductor arrangement thus constructed will now be described with concurrent reference to FIGS. 13 and 14. FIG. 13 illustrates characteristics curves *a* and *b* indicating relationships between the amount of displacement of the core 79 relative to the stationary coil 74 or bobbin 75 and the input power on the inductor arrangement, wherein the curve *a* shows the characteristic achieved where the arrangement is void of the movable coil 76 so that the variable inductor is made up of only the stationary coil 74 and core 79 and the curve *b* shows the characteristics achieved in the arrangement shown in FIG. 12. FIG. 14, on the other hand, illustrates characteristics curves *c* and *d* indicating the relationships between the amount of displacement of the core 79 and the inductance achieved in the variable inductor of the prior art construction and the variable inductor arrangement shown in FIG. 12, respectively.

When the induction heating equipment using the variable inductor is subjected to a load, viz., when the material to be heated is placed in proximity to the induction heating coil and the inverter device is switched in, then the characteristics as indicated by the curve *a* or *b* will be achieved as the core 79 is moved deeper into the stationary coil 74, provided an input power of 1.3 kilowatt is achieved when the core 79 is out of the coil 74. When the variable inductor is not provided with the movable coil 76, then the relation between the core displacement and the input power varies in a quadratic fashion, as indicated by the curve *a* which has its rate of change steeply decreasing in the neighbourhood of 0.4 kilowatt. This is apparently objectionable for accurately controlling the inductance of the inverter unit during operation. In the variable inductor arrangement using the movable coil 76 as above described and shown in FIG. 12, such drawback is eliminated as seen from the curve *b* which is substantially linear to have its rate of change maintained practically constant to the advantage of accurately controlling the inductance of the inverter unit. This will be accounted for from the following reasons.

In spite of the fact that the relation between the core displacement and the resultant inductance is indicated by a nearly linear curve as seen in FIG. 14, the rate of change of the current supplied to the induction heating coil diminishes as the inductance increases with the result that the coil is saturated when the inductance reaches a given level. To prevent such saturation of the induction heating coil, it is required to have the rate of change of the current on the coil increased as the core is moved deeper into the stationary coil of the variable inductor, viz., the inductance of the variable inductor increases. The movable coil 76 in the arrangement shown in FIG. 12 is thus intended to vary the rate of change of the inductance achieved by the variable inductor, whereby the rate of change of inductance can be abruptly increased as the core approaches the movable coil. Provision of the movable coil in the variable inductor arrangement is therefore useful in achieving linear variation of the input power of the inductor by movement of the core relative to the stationary and movable coils, providing ease of calibrating the inverter circuit in an initial condition, and simplifying the construction of the inductor assembly which would otherwise require provision of intricate locking mechanisms to achieve the linear variation of the inductance.

It is to be noted that the variable inductor having the construction shown in FIG. 12 can be connected either in series or in parallel with the induction heating coil of the inverter unit.

Figure 15:
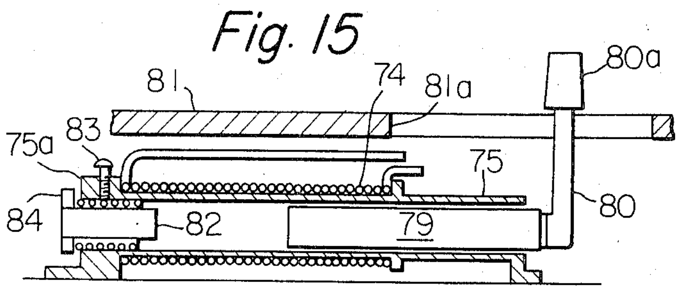
FIG. 15 is a sectional view showing a construction in still another preferred form of the control means for the variable inductor of the inverter device of the induction heating equipment according to the present invention.
Figure 16:
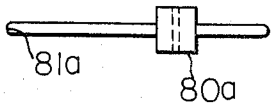
FIG. 16 is a front end view of the control lever and an elongated slot forming part of the control means shown in FIG. 15.

As an alternative to the provision of the movable coil in combination with the stationary coil as in the arrangement described above, a compensating core may be used in combination with the stationary coil and the core movable through the coil, an example of such arrangement being illustrated in FIGS. 15 and 16.

Referring to FIGS. 15 and 16, the variable inductor has a stationary coil 74 wound on a bored bobbin 75 having an axial extension 75*a* and a ferrite or aluminium core 79 movable through the axial bore in the bobbin 75, similarly to the arrangement of FIG. 12. The core 79 is invariably connected to an adjusting lever 80 which is movable through an elongated slot 81*a* in the stationary panel 81. Different from the arrangement shown in FIG. 12, the inductor herein shown has an auxiliary core 82 of ferrite or aluminium which is inserted into the axial bore in the extension of the bobbin 75 opposite to and in alignment with the main core 79. The auxiliary core 82 is associated with an adjusting lever 83 mounted on the extension 75*a* of the bobbin 75 and is provided at its outer end a stop member 84 which is engageable with the end of the extension 75*a* when the auxiliary core 82 toward the main core 79. Through provision of the auxiliary or compensating core 82, the input power on the variable inductor varies substantially linearly as the main core 79 is axially moved relative to the stationary coil 74 and to the compensating core 82 with the result that the rate of change of the inductance achievable by the variable inductor arrangement shown in FIGS. 15 and 16 can be maintained substantially constant as in the case of the arrangement previously described. The characteristics of the variable inductor as indicated in FIGS. 13 and 14 are thus generally applicable to the arrangement of FIGS. 15 and 16.

The control of the output power from the inverter device may be effected not only by adjusting the inductance by the use of the variable inductor or through use of a variable commutating induction element or capacitor forming part of the inverter unit.

Figure 17:
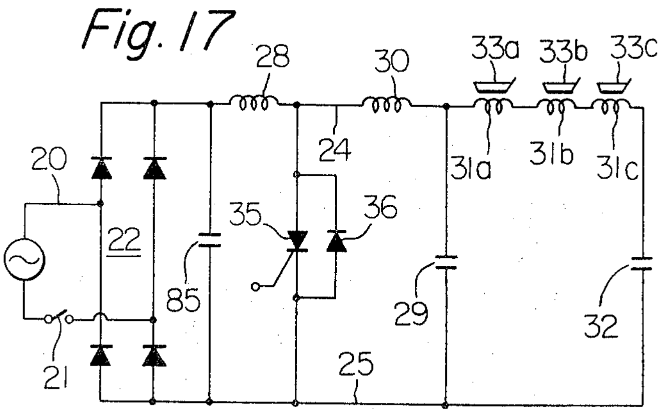
FIG. 17 is a schematic circuit diagram showing a circuit arrangement incorporating a plurality of induction heating coils in accordance with the present invention.
Figure 18:
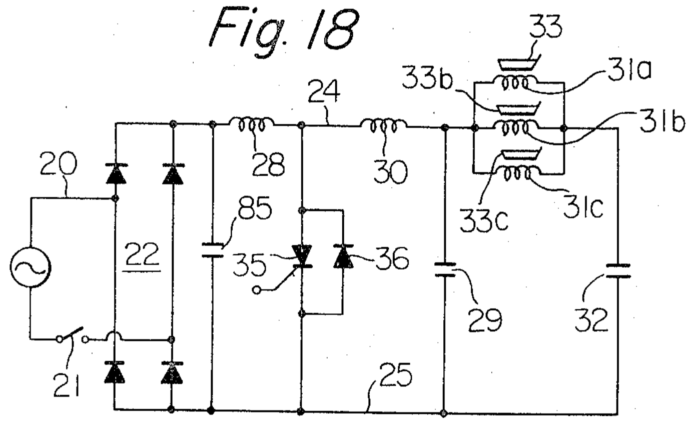
FIG. 18 is similar to FIG. 17 but now illustrates a modification of the circuit arrangement shown in FIG. 17.

Various preferred constructions of the noise preventive means, leak current preventive means and variable inductor arrangements for use in the inverter device of the induction heating equipment according to the present invention have thus far been described. These means and arrangements may be used either independently or in combination with others. The overall circuit arrangement shown in FIG. 1 is, moreover, by way of example only and, as such, the noise preventive means, leak current preventive means and/or variable inductor arrangements herein disclosed may be applied to inverter devices of other constructions such as having two or more induction heating coils. FIGS. 17 and 18 illustrate examples of the schematic circuit arrangements using three induction heating coils 31*a*, 31*b* and 31*c* for induction heating the materials 33*a*, 33*b* and 33*c* respectively placed in proximity to these coils. The induction heating coils 31*a*, 31*b* and 31*c* are serially connected to the bus lines 24 and 25 of the inverter circuit shown in FIG. 17 while the induction heating coils 31*a* to 31*c* in the inverter circuit shown in FIG. 18 are connected in parallel to the bus lines 24 and 25. The remaining elements appearing in FIGS. 17 and 18 are in correspondance with those indicated by like reference numerals in FIG. 1 and, as such, no detailed description of these will be further incorporated herein. The circuit arrangements illustrated in FIGS. 17 and 18 are adapted to induction heat a number of materials all at a time so as to provide an increased efficiency of the induction heating process. The connections between the plurality of heating elements illustrated in FIGS. 17 and 18 are merely by way of example and, therefore, other connections of these elements will feasible depending upon the user requirements.

What is claimed is:

1. An induction heating equipment having a fullwave rectifier providing a power source, through two bus lines, for a chopper type inverter unit, said unit including an induction heating coil and a filter inductor serially connected in one of said bus lines, and an insulating plate disposed upon said induction heating coil for supporting materials to be heated by this coil, said insulating plate carrying on its upper surface, where said material to be heated in placed, an electrically conductive film strip having a width of up to 5mm and being grounded at one end thereof for discharging capacitively developed charges on said material, said film strip occupying only a limited space on said plate to allow magnetic fluxes from said induction heating coil to cause a sufficient amount of eddy current in said material.

2. An induction heating equipment as defined in claim 1, wherein said film strip is formed of a substance selected from the group consisting of copper, nickel, carbon and tin oxide.

* * * * *